United States Patent
Hatakeyama (10) Patent No.: US 8,934,732 B2
(45) Date of Patent: Jan. 13, 2015

(54) IMAGE PROCESSING METHOD, IMAGE PROCESSING APPARATUS AND IMAGE PICKUP APPARATUS

(75) Inventor: Koshi Hatakeyama, Tokyo (JP)

(73) Assignee: Canon Kabushiki Kaisha (JP)

( * ) Notice: Subject to any disclaimer, the term of this patent is extended or adjusted under 35 U.S.C. 154(b) by 199 days.

(21) Appl. No.: 13/592,471

(22) Filed: Aug. 23, 2012

(65) Prior Publication Data

US 2013/0050541 A1 Feb. 28, 2013

(30) Foreign Application Priority Data

Aug. 26, 2011 (JP) ................................. 2011-184794

(51) Int. Cl.
*G06K 9/40* (2006.01)
*G06T 5/00* (2006.01)
*H04N 5/232* (2006.01)
*H04N 5/357* (2011.01)

(52) U.S. Cl.
CPC ............ *G06T 5/003* (2013.01); *H04N 5/23229* (2013.01); *H04N 5/3572* (2013.01); *G06T 2207/10024* (2013.01); *G06T 2207/20056* (2013.01)
USPC ...................... 382/260; 348/207.1; 348/222.1; 348/349

(58) Field of Classification Search
USPC ............. 382/254, 260; 348/222.1, 349, 207.1
See application file for complete search history.

(56) References Cited

U.S. PATENT DOCUMENTS

| | | | |
|---|---|---|---|
| 5,627,918 A * | 5/1997 | Carasso | 382/254 |
| 2009/0244513 A1* | 10/2009 | Matsumoto et al. | 355/77 |
| 2010/0079626 A1* | 4/2010 | Hatakeyama | 348/241 |
| 2010/0246952 A1* | 9/2010 | Banner et al. | 382/167 |

(Continued)

FOREIGN PATENT DOCUMENTS

| | | |
|---|---|---|
| CN | 101258740 A | 9/2008 |
| CN | 102165761 A | 8/2011 |

(Continued)

OTHER PUBLICATIONS

Office Action issued in CN201210298584.6 mailed on Sep. 19, 2014. English translation provided.

(Continued)

*Primary Examiner* — Chan Park
*Assistant Examiner* — Eueng-Nan Yeh
(74) *Attorney, Agent, or Firm* — Rossi, Kimms & McDowell LLP (57) ABSTRACT

The image processing method acquires an input image and information on an image capturing condition, acquires an optical transfer function corresponding to the image capturing condition, calculates a specific frequency at which an index value obtained by using the optical transfer function becomes a predetermined value in each azimuth direction, and produces a window function to divide a frequency band of the input image into lower and higher frequency side bands than the specific frequency in each azimuth direction. Then, the method produces, by using the window function and the optical transfer function, an image restoration filter to perform the image restoration process on the lower frequency side band of the input image and to restrict the image restoration process on the higher frequency side band thereof, and performs the image restoration process using the image restoration filter.

12 Claims, 9 Drawing Sheets

(56) References Cited

U.S. PATENT DOCUMENTS

2011/0128422 A1 6/2011 Nagata
2011/0193997 A1 8/2011 Hatakeyama

FOREIGN PATENT DOCUMENTS

JP 2007-183842 A 7/2007
JP 2011135563 A 7/2011

OTHER PUBLICATIONS

Weihong Ma, "Study of MTF Measurement Technique Based on Image Analysis" China Doctorial Dissertation Full Text Database, Album of Basic Science, Apr. 15, 2006, Chapter Two. English abstract of pp. 7-9 provided.

* cited by examiner

IMAGE PROCESSING METHOD, IMAGE PROCESSING APPARATUS AND IMAGE PICKUP APPARATUS

BACKGROUND OF THE INVENTION

1. Field of the Invention

The present invention relates to an image processing technique for performing an image restoration process to correct (reduce) degradation of an image produced by an image pickup apparatus.

2. Description of the Related Art

Captured images produced by image pickup apparatuses such as digital cameras include a blur component that is an image degradation component caused by various aberrations of an image capturing optical system (hereinafter simply referred to as "an optical system") such as spherical aberration, comatic aberration, field curvature and astigmatism. Such a blur component is generated because a light flux emitted from one point of an object forms an image with some divergence on an image pickup surface of an image sensor, the light flux being normally converged at one point if there is no aberration or diffraction.

The blur component herein is optically expressed as a point spread function (PSF), and is different from blur caused by defocusing. Moreover, color blur in a color image generated due to longitudinal chromatic aberration, chromatic spherical aberration or chromatic comatic aberration of the optical system can be said to be a difference between blurring degrees of respective light wavelengths. Moreover, lateral color shift caused by chromatic aberration of magnification of the optical system can be said to position shift or phase shift due to difference in image capturing magnifications for respective light wavelengths.

Fourier transform of the point spread function (PSF) provides an optical transfer function (OTF) showing frequency component information on aberration and being expressed by a complex number. An absolute value of the optical transfer function (OTF), that is, an amplitude component is called a modulation transfer function (MTF), and a phase component is called a phase transfer function (PTF). The MTF and PTF respectively show frequency characteristics of amplitude and phase components of image degradation due to aberration. In the following description, the phase component is expressed as a phase angle by the following expression where Re(OTF) and Im(OTF) respectively represent a real part and an imaginary part of the OTF.

PTF=tan$^{-1}$ [Im(OTF)/Re(OTF)]

As described above, the optical transfer function (OTF) of the optical system provides degradation to the amplitude and phase components of the image, so that the degraded image includes, at each point of the object, asymmetric blur like comatic aberration.

As a method for correcting such degradation of the amplitude component (MTF) and degradation of the phase component (PTF) in the degraded image (input image), there is known a method using information on the optical transfer function (OTF) of the optical system. This method is referred to as "image restoration" or "image recovery", and a process for correcting the degraded image by using the information on the optical transfer function (OTF) of the optical system is hereinafter referred to as "an image restoration process". As one of the image restoration processes, a convolution method that performs convolution of an image restoration filter having an inverse characteristic to the optical transfer function on the input image in a real space.

In order to effectively perform the image restoration process, it is necessary to acquire a more accurate OTF of the optical system. For example, information on design values of the optical system makes it possible to calculate the OTF. Moreover, performing Fourier transform on an intensity distribution in a captured image of a point light source makes it possible to calculate the OTF.

The OTFs of general optical systems, except those of optical systems designed and manufactured so as to have extremely high performance, significantly vary depending on image heights (positions in the input image). Therefore, in order to highly accurately perform the image restoration process on the input image, it is necessary to use an image restoration filter produced based on variation of the OTF depending on the image height. In order to change an image restoration characteristic depending on the image height, it is desirable to perform the image restoration process with changing of the image restoration filter in the real space.

Japanese Patent Laid-Open No. 2007-183842 discloses an image processing method that uses a controlling parameter to control degree of the image restoration and thereby continuously changes the degree of the image restoration.

However, depending on characteristics of lenses in the optical system or image capturing conditions, a case may occur in which the MTF falls to zero or approximately zero in a Nyquist frequency band of the image sensor. The fall of the MTF to zero or approximately zero is hereinafter referred to as "zero fall", and a frequency at which the zero fall occurs is hereinafter referred to as "a zero fall frequency".

Figure 12A:
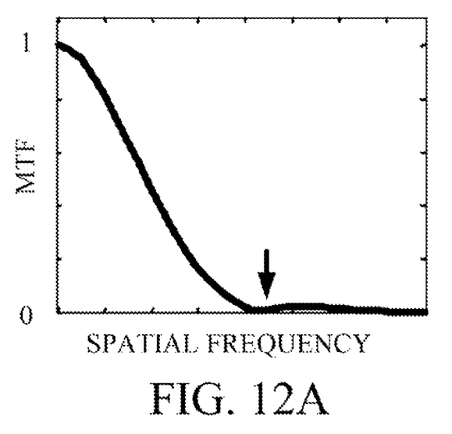
FIGS. 12A to 12C show a conventional image restoration process using a Wiener filter.

The zero fall is caused by aberration or diffraction. Moreover, the zero fall is also caused by hand jiggling of a user using the image pickup apparatus. FIG. 12A shows an example of the zero fall, where a horizontal axis shows spatial frequency and a vertical axis shows MTF. The zero fall occurs at a frequency indicated by a downward arrow in the figure, and this frequency is the zero fall frequency.

Figure 12B:
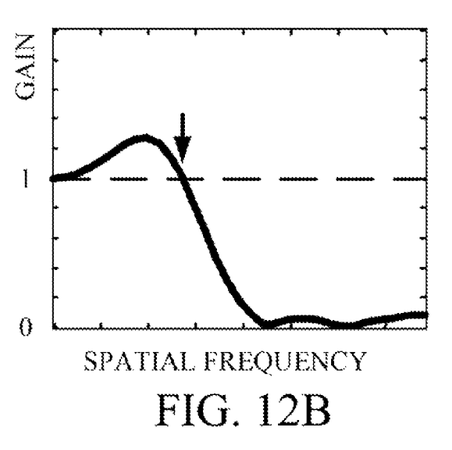

A Wiener filter to be generally used for the image restoration process provides an absolute value of a frequency characteristic (restoration gain characteristic) of the image restoration filter shown in FIG. 12B, where a horizontal axis shows spatial frequency and a vertical axis shows restoration gain. A detailed description of the Wiener filter will be made later.

Figure 12C:
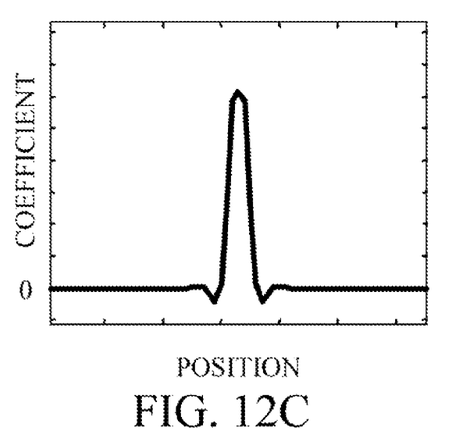

In FIG. 12B, amplification is obtained in a lower frequency side band than a frequency indicated by a downward arrow, but a low-pass filter effect is obtained in a higher frequency side band than that frequency. This restoration gain characteristic provides an image restoration filter having a profile (coefficients of respective positions (taps) in the filter) in the real space, which is shown in FIG. 12C. The image restoration process using such an image restoration filter generates blur in high frequency details in the input image.

Figure 13A:
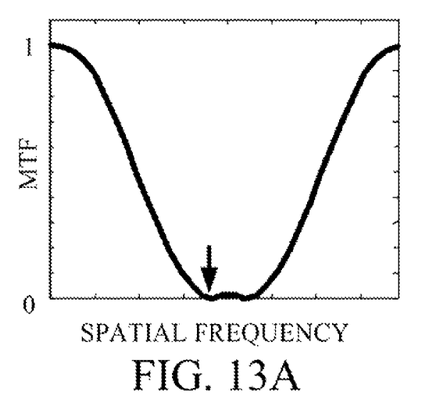
FIGS. 13A to 13C show another conventional image restoration process using the Wiener filter.
Figure 13B:
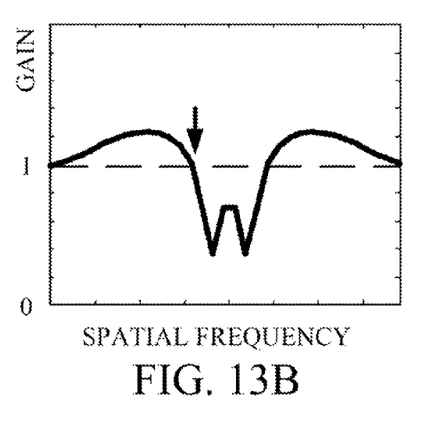
Figure 13C:
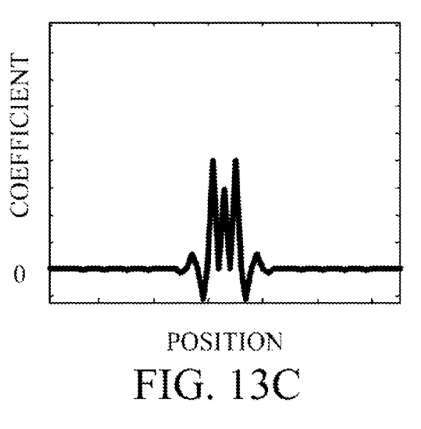

Moreover, FIGS. 13A to 13C show another example. A horizontal axis in FIG. 13A shows frequency up to a sampling frequency that is twice the Nyquist frequency. FIG. 13B shows a restoration gain characteristic of the image restoration filter, and FIG. 13C shows a profile of the image restoration filter in the real space. In FIG. 13C, coefficient values of the image restoration filter are greatly changed at plural positions in a narrow positional range.

There is a case where, when the PSF of the input image is different from the PSF of the optical system because of manufacturing errors of the optical system, luminance saturation in the input image or the like, artifact such as ringing is generated in a resulting image (restored image) of the image restoration process. In such a case, the image restoration filter shown in FIG. 13C becomes sensitive to the difference in PSF, which easily generate the artifact.

Thus, in order to acquire a high-definition restored image, a countermeasure against the zero fall is very important.

Although the image processing method disclosed in Japanese Patent Laid-Open No. 2007-183842 is able to control the degree of the image restoration, this method allows user's change of the degree of the image restoration, but is not able to change the characteristic of the image restoration filter according to the zero fall frequency. Therefore, the method disclosed in Japanese Patent Laid-Open No. 2007-183842 can decrease the degree of the image restoration for suppressing the artifact due to the zero fall, but cannot provide a high-definition restored image.

SUMMARY OF THE INVENTION

The present invention provides an image processing technique for providing a high-definition restored image even when the zero fall of the MTF exists.

The present invention provides as an aspect thereof an image processing method for performing an image restoration process on an input image produced by an image pickup apparatus. The method includes a step of acquiring the input image and information on an image capturing condition at a time of producing the input image in the image pickup apparatus, a step of acquiring an optical transfer function of the image pickup apparatus corresponding to the information on the image capturing condition, a step of calculating a specific frequency at which an index value obtained by using the optical transfer function becomes a predetermined value in each of azimuth directions, a step of producing a window function to divide a frequency band of the input image into a lower frequency side band and a higher frequency side band than the specific frequency calculated in each of the azimuth directions, a step of producing, by using the window function and the optical transfer function, an image restoration filter to perform the image restoration process on the lower frequency side band of the input image and to restrict the image restoration process on the higher frequency side band thereof, and a step of performing the image restoration process using the image restoration filter.

The present invention provides as another aspect thereof an image processing apparatus configured to perform an image restoration process on an input image produced by an image pickup apparatus. The image processing apparatus includes an inputting part configured to acquire the input image and information on an image capturing condition at a time of producing the input image in the image pickup apparatus, a calculating part configured to acquire an optical transfer function of the image pickup apparatus corresponding to the information on the image capturing condition and configured to calculate a specific frequency at which an index value obtained by using the optical transfer function becomes a predetermined value in each of azimuth directions, a window function producing part configured to produce a window function to divide a frequency band of the input image into a lower frequency side band and a higher frequency side band than the specific frequency calculated in each of the azimuth directions, a filter producing part configured to produce, by using the window function and the optical transfer function, an image restoration filter to perform the image restoration process on the lower frequency side band of the input image and to restrict the image restoration process on the higher frequency side band thereof, and a processing part configured to perform the image restoration process using the image restoration filter.

The present invention provides as still another aspect thereof an image pickup apparatus provided with the above image processing apparatus.

The present invention provides as yet still another aspect thereof a non-transitory storage medium storing an image processing program to cause a computer to execute an image restoration process on an input image produced by an image pickup apparatus. The program includes a step of causing the computer to acquire the input image and information on an image capturing condition at a time of producing the input image in the image pickup apparatus, a step of causing the computer to acquire an optical transfer function of the image pickup apparatus corresponding to the information on the image capturing condition, a step of causing the computer to calculate a specific frequency at which an index value obtained by using the optical transfer function becomes a predetermined value in each of azimuth directions, a step of causing the computer to produce a window function to divide a frequency band of the input image into a lower frequency side band and a higher frequency side band than the specific frequency calculated in each of the azimuth directions, a step of causing the computer to produce, by using the window function and the optical transfer function, an image restoration filter to perform the image restoration process on the lower frequency side band of the input image and to restrict the image restoration process on the higher frequency side band thereof, and a step of causing the computer to perform the image restoration process using the image restoration filter.

Further features of the present invention will become apparent from the following description of exemplary embodiments (with reference to the attached drawings).

DESCRIPTION OF THE PREFERRED EMBODIMENTS

Exemplary embodiments of the present invention will hereinafter be described with reference to the accompanying drawings.

First of all, prior to description of specific embodiments, description will be made of definition of terms to be used in the embodiments and an image restoration process performed in the embodiments.

"Input Image"

The input image is a digital image produced by image capturing performed by an image pickup apparatus, that is, by using output from an image sensor photoelectrically converting an object image formed by an image capturing optical system. The image sensor is constituted by a photoelectric conversion element such as a CCD sensor or a CMOS sensor. The digital image is degraded according to an optical transfer function (OTF) of the image pickup apparatus, that is, of the image capturing optical system constituted by lenses and various optical filters and including aberrations. The image capturing optical system may be constituted by reflective surfaces such as mirrors each having curvature. Moreover, the image capturing optical system may be detachably attachable (interchangeable) to the image pickup apparatus. In the image pickup apparatus, the image sensor and a signal processor that produces the digital image (input image) by using the output from the image sensor constitute an image capturing system.

The input image has information on color components such as R, G and B components. The color components can be also expressed by, other than the RGB, an optionally selected one of general color spaces such as LCH (lightness, chroma and hue), YCbCr (luminance, blue color difference and red color difference), XYZ, Lab, Yuv and JCh, or can be expressed by color temperature.

The input image and a restored image (output image) can be provided with information on an image capturing condition in the image pickup apparatus at a time of producing the input image, the image capturing condition including a focal length and an aperture value of the image capturing optical system, an image capturing distance (object distance) and the like. The information on the image capturing condition is hereinafter referred to as "image capturing condition information". In addition, the input image can be provided with various correction information to be used for correction of the input image.

When outputting the input image from the image pickup apparatus to an image processing apparatus separated therefrom and performing the image restoration process in the image processing apparatus, it is desirable to add the image capturing condition information and the correction information to the input image. The image processing apparatus can receive the image capturing condition information and the correction information from the image pickup apparatus not only by addition to the input image, but also through direct or indirect communication and through a storage medium detachably attachable to these apparatuses.

"Image Restoration Process"

The outline of the image restoration process is as follows. When $g(x,y)$ represents an input image (degraded image), $f(x,y)$ represents a non-degraded original image, $h(x,y)$ represents a point spread function (PSF) that forms a Fourier pair with the optical transfer function (OTF), * represents convolution, and (x,y) represents coordinates in the input image, the following expression is established:

$$g(x,y)=h(x,y)*f(x,y).$$

Converting the above expression into a form of a two-dimensional frequency surface through Fourier transform provides the following expression of a form of a product for each frequency:

$$G(u,v)=H(u,v)\cdot F(u,v)$$

where H represents a result of the Fourier transform of the point spread function (PSF), in other words, the optical transfer function (OTF), G and F respectively represent results of the Fourier transform of g and h, and (u,v) represents coordinates on the two-dimensional frequency surface, in other words, a frequency.

Dividing both sides of the above expression by H as below provides the original image from the degraded image produced by the image pickup apparatus:

$$G(u,v)/H(u,v)=F(u,v).$$

Returning F(u,v), that is, G(u,v)/H(u,v) to a real surface by inverse Fourier transform provides a restored image equivalent to the original image f(x, y).

When R represents a result of the inverse Fourier transform of $H^{-1}$, performing a convolution process for an image in the real surface as represented by the following expression also enables provision of the original image:

$$g(x,y)*R(x,y)=f(x,y).$$

This R(x,y) in the above expression is an image restoration filter. When the input image is a two-dimensional image, the image restoration filter is generally also a two-dimensional filter having taps (cells) each corresponding to each of pixels of the two-dimensional image. Moreover, increase of the number of the taps (cells) in the image restoration filter generally improves image restoration accuracy, so that a realizable number of the taps is set depending on requested image quality, image processing capability, aberration characteristics of the image capturing optical system and the like.

Since the image restoration filter needs to reflect at least the aberration characteristics, the image restoration filter is different from a conventional edge enhancement filter (high-pass filter) or the like having about three taps in each of horizontal and vertical directions. The image restoration filter is produced based on the optical transfer function (OTF), which can highly accurately correct degradation of amplitude and phase components of the degraded image (input image).

Moreover, since an actual input image (degraded image) includes a noise component, use of an image restoration filter produced from the complete inverse number of the optical transfer function (OTF) as described above not only restores the degraded image, but also significantly amplifies the noise component. This is because such an image restoration filter raises a modulation transfer function (MTF), that is, an amplitude component of the image capturing optical system to 1 over an entire frequency range in a state where amplitude of the noise component is added to the amplitude component of the input image. Although the MTF corresponding to amplitude degradation by the image capturing optical system is returned to 1, power spectrum of the noise component is simultaneously raised, which results in amplification of the noise component according to a degree of raising of the MTF, that is, a restoration gain.

Therefore, the noise component included in the input image makes it impossible to provide a good restored image as an image for appreciation. Such raising of the noise component is shown by the following expressions where N represents the noise component:

$$G(u,v)=H(u,v)\cdot F(u,v)+N(u,v)$$

$$G(u,v)/H(u,v)=F(u,v)+N(u,v)/H(u,v).$$

As a method for solving such a problem, there is known, for example, a Wiener filter expressed by the following expression (1), which controls image restoration degree according to an intensity ratio (SNR) of an image signal and a noise signal.

$$M(u, v) = \frac{1}{H(u, v)} \frac{|H(u, v)|^2}{|H(u, v)|^2 + SNR^2} \quad (1)$$

In the above expression (1), M(u,v) represents a frequency characteristic of the Wiener filter, and |H(u,v)| represents an absolute value (MTF) of the optical transfer function (OTF). This method decreases, at each frequency, the restoration gain as the MTF is lower, in other words, increases the restoration gain as the MTF is higher. The MTF of general image capturing optical systems is high on a low frequency side and low on a high frequency side, so that the method resultantly suppresses the restoration gain on the high frequency side of the image signal.

Figure 2:
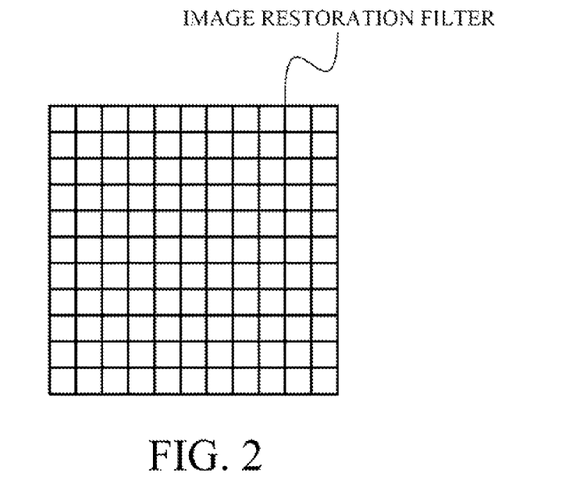
FIG. 2 shows an image restoration filter to be used for an image restoration process in the image processing of Embodiment 1.
Figure 3:
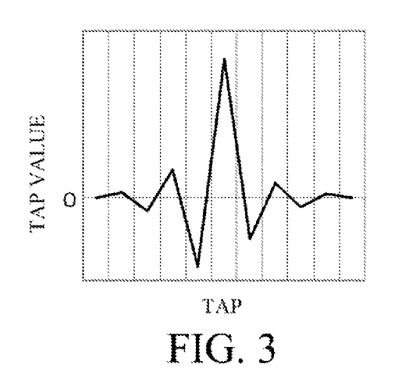
FIG. 3 shows values of taps in the image restoration filter in Embodiment 1.

An example of the image restoration filter is shown in FIGS. 2 and 3. For the image restoration filter, the number of the taps (cells) is decided according to aberration characteristics of the image capturing optical system and required image restoration accuracy. The image restoration filter shown in FIG. 2 is a two-dimensional filter having 11×11 taps. Although FIG. 2 omits values (coefficient values) in the respective taps, FIG. 3 shows one cross section of this image restoration filter where values of the taps (hereinafter also referred to as "tap values") are shown by a polygonal line. A distribution of the tap values in the image restoration filter plays a role to return signal values (PSF) spatially spread due to the aberration to, ideally, one point.

The image restoration process performs convolution of each tap value of the image restoration filter on each pixel (corresponding to each tap) of the input image. In the convolution, in order to improve the signal value of a certain pixel in the input image, that pixel is matched to a center tap of the image restoration filter. Then, a product of the pixel signal value of the input image and the tap value (coefficient value) of the image restoration filter is calculated for each corresponding pair of the pixel in the input image and the tap of the image restoration filter, and the signal value of the pixel corresponding to the center tap of the filter is replaced by a total sum of the products.

Figure 4A:
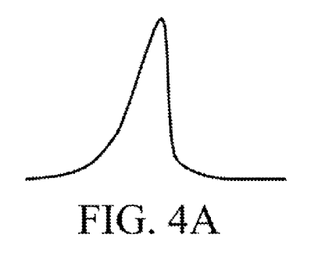
FIGS. 4A and 4B respectively show PSFs before and after the image restoration process in Embodiment 1.
Figure 4B:
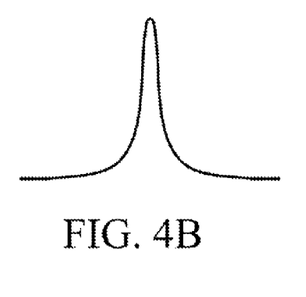
Figure 5A:
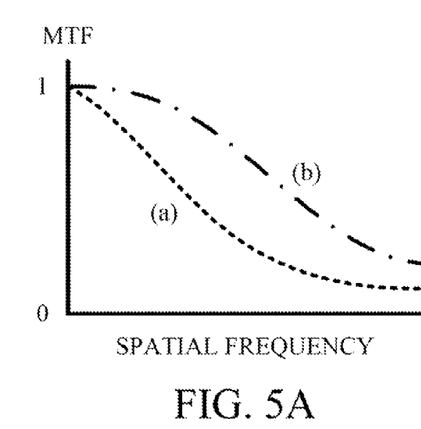
FIGS. 5A and 5B respectively show MTFs and PTFs before and after the image restoration process in Embodiment 1.
Figure 5B:
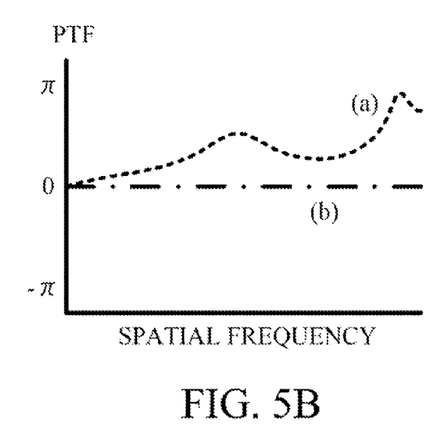

Characteristics of the image restoration in a real space and a frequency space will be described with reference to FIGS. 4A, 4B, 5A and 5B. FIG. 4A shows a PSF (point spread function) before the image restoration, and FIG. 4B shows a PSF after the image restoration. FIG. 5A shows (a) an MTF before the image restoration and (b) an MTF after the image restoration. FIG. 5B shows (a) a PTF (phase transfer function) before the image restoration and (b) a PTF after the image restoration. The PSF before the image restoration asymmetrically spreads, and the PTF changes non-linearly with frequency due to the asymmetry. The image restoration process amplifies the MTF and corrects the PTF to zero, so that the PSF after the image restoration becomes symmetric and sharp.

This image restoration filter can be obtained by inverse Fourier transform of a function designed on the basis of an inverse function of the optical transfer function (OTF) of the image capturing optical system. The image restoration filter used in the embodiments can be arbitrarily changed, and for example, the Wiener filter may be used as the image restoration filter. In the case of using the Wiener filter, the image restoration filter for the convolution on the input image in the real space can be produced by the inverse Fourier transform of the expression (1).

Moreover, since the optical transfer function (OTF) changes according to image heights (positions in the input image) even though the image capturing condition is same, the image restoration filter to be used is changed according to the image heights.

Specific embodiments of the present invention will hereinafter be described.

Embodiment 1

Figure 1:
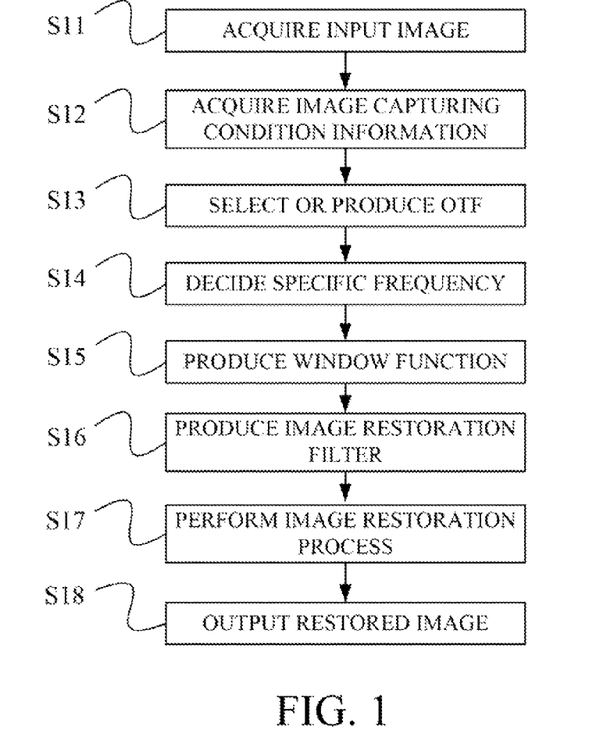
FIG. 1 is a flowchart of image processing that is Embodiment 1 of the present invention.

FIG. 1 is a flowchart showing a procedure of image processing (image processing method) that is a first embodiment (Embodiment 1) of the present invention. The image processing is performed by a computer constituted by a CPU or the like and included in an image processing apparatus, according to an image processing program as a computer program installed through a storage medium such as a semiconductor memory or an optical disc.

At step S11, the computer acquires an input image (hereinafter also referred to as "a captured image") from an image pickup apparatus. The acquisition of the captured image from the image pickup apparatus may be performed through wired or wireless communication between the image processing apparatus and the image pickup apparatus or through a storage medium such as a semiconductor memory or an optical disc.

Next at step S12, the computer acquires the image capturing condition information at a time of image capturing (that is, at a time of producing the captured image) by the image pickup apparatus. The image capturing condition information includes, as mentioned above, parameters such as the focal length and the aperture value of the image capturing optical system, the image pickup distance, and furthermore identification information of the image pickup apparatus (camera ID). When the image capturing optical system is provided as an interchangeable lens, the image capturing condition information includes identification information of the interchangeable lens (lens ID). The image capturing condition information may be acquired as information provided with the captured image, or may be acquired through wired or wireless communication or through a storage medium.

Next at step S13, the controller acquires an optical transfer function corresponding to (appropriate for) the image capturing condition. The optical transfer function may be acquired by selecting one corresponding to the image capturing condition from plural optical transfer functions prestored in a memory provided inside or outside the image processing apparatus, or by producing (calculating) it from a prestored function including variables for which the parameters of the image capturing condition are substituted.

The plural optical transfer functions corresponding to discretely selected image capturing conditions may be prestored in the memory. In this case, when actual image capturing condition is different from the stored image capturing conditions, an optical transfer function corresponding to the actual image capturing condition can be produced by interpolation calculation using optical transfer functions corresponding to two or more image capturing conditions near the actual image capturing condition. Such discrete selection can reduce amount of data of the optical transfer functions to be stored in the memory. The interpolation calculation may be performed by any method, such as bilinear interpolation (linear interpolation) or bicubic interpolation.

Next at step S14, the computer acquires a specific frequency at which an index value obtained by using the optical transfer function acquired at step S13 becomes a threshold value (predetermined value). This embodiment uses an absolute value (MTF) of the optical transfer function (OTF) as the index value. However, any other index values may be used as long as they are obtained by using the optical transfer function. A detailed description of the index value will be made later.

Next at step S15, the computer produces a window function whose value is zero at the specific frequency. A detailed description of the window function will be made later.

Next at step S16, the computer produces the image restoration filter by using the optical transfer function and the window function. A detailed description of the production of the image restoration filter will be made later.

Next at step S17, the computer performs the convolution of the image restoration filter on the captured image, that is, performs the image restoration process on the captured image, and performs a predetermined development process thereon. Then, at step S18, the computer outputs a restored image as an output image.

Figure 6:
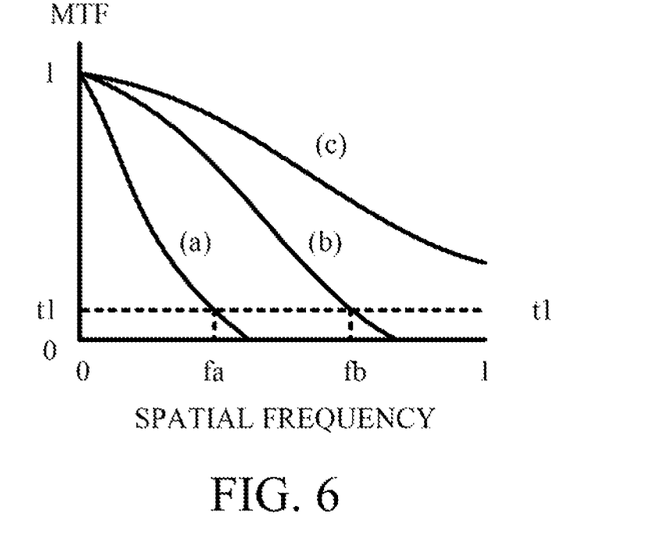
FIG. 6 shows MTFs and zero fall frequencies in mutually different azimuth directions in Embodiment 1.

A detailed description of how to obtain the specific frequency at step S14 will be made. FIG. 6 shows frequency characteristics of MTFs (a), (b) and (c). The MTFs (a), (b) and (c) shown in FIG. 6 are normalized with 1 shown on a horizontal axis as a Nyquist frequency decided by a pixel pitch of the image sensor. The MTFs (a), (b) and (c) in FIG. 6 show examples of MTF in three azimuth directions in which optical characteristics of the image capturing optical system are mutually different. Frequencies fa and fb at which the MTFs (a) and (b) become a threshold value t1 are specific frequencies in their respective azimuth directions. The MTF (c) does not become the threshold value t1, and therefore no specific frequency exists in its azimuth direction. The threshold value t1 can be arbitrarily set according to purposes. For example, in a case of using the specific frequency as the above-mentioned zero fall frequency, the threshold value t1 is set to 0. However, for practical purposes, an MTF that is not completely 0 but sufficiently small can be regarded as 0, so that the threshold value t1 may be set to a value larger than 0, for example, 0.03 (an MTF of 3%), and a frequency at which the MTF becomes this value may be defined as the specific frequency corresponding to the zero fall frequency.

In a case where the MTF increases or decreases near 0 with frequency, such as a case where spurious resolution exists, plural frequencies exist at which the MTF changes so as to pass the threshold value from a higher side than the threshold value to a lower side than the threshold value. In such a case, it is desirable to use a lowest one of the plural frequencies as the specific frequency.

In addition, in a case where the MTFs in plural azimuth directions are mutually different as shown in FIG. 6, it is desirable to also set mutually different specific frequencies for the respective azimuth directions. In such a case, the different specific frequencies for the respective azimuth directions can be stored as functional data or lookup table data. On the other hand, one (for example, a lowest one) of the different specific frequencies for the respective azimuth directions can be used as a representative specific frequency.

Next, a detailed description of the process for producing the image restoration filter at step S16 will be made. In the following description, the Wiener filter expressed by the above-mentioned expression (1) is used as an exemplary basic function for designing the image restoration filter. The process produces a frequency characteristic $M_L(u,v)$ of the image restoration filter according to the following expression (2) by using $M(u,v)$ in the expression (1) and a window function $W(u,v)$.

$$M_L(u,v)=(M(u,v)-1) \cdot W(u,v)+1 \qquad (2)$$

The image restoration filter having the frequency characteristic $M_L(u,v)$ performs the image restoration process only in a frequency band (hereinafter referred to as "an image restoration band") restricted by the window function. In other words, the image restoration filter is produced so as to perform, according to the window function, the image restoration process on a lower frequency band (hereinafter referred to as "a lower frequency side band") than the specific frequency in the captured image, and so as to restrict the image restoration process on a higher frequency band (hereinafter referred to as "a higher frequency side band") than the specific frequency.

Figure 9A:
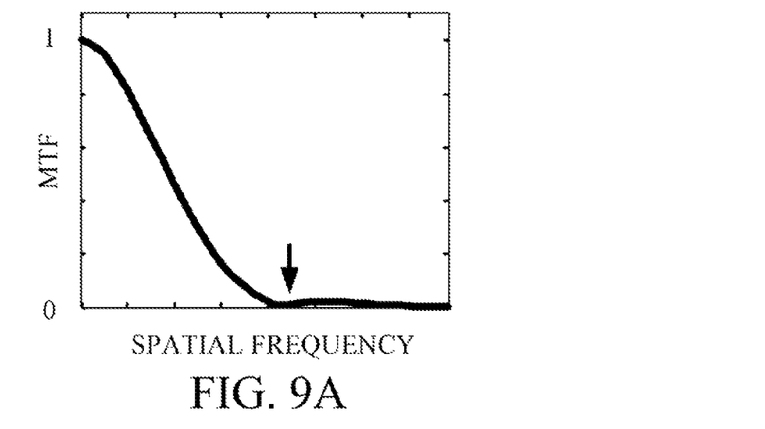
FIGS. 9A to 9C show a characteristic of the image restoration filter in Embodiment 1.

Description of such an image restoration filter will be made with reference to FIGS. 9A to 9C. FIG. 9A shows the same MTF as that shown in FIG. 12A. In FIG. 9A, a horizontal axis shows spatial frequency, and a vertical axis shows MTF.

Figure 9B:
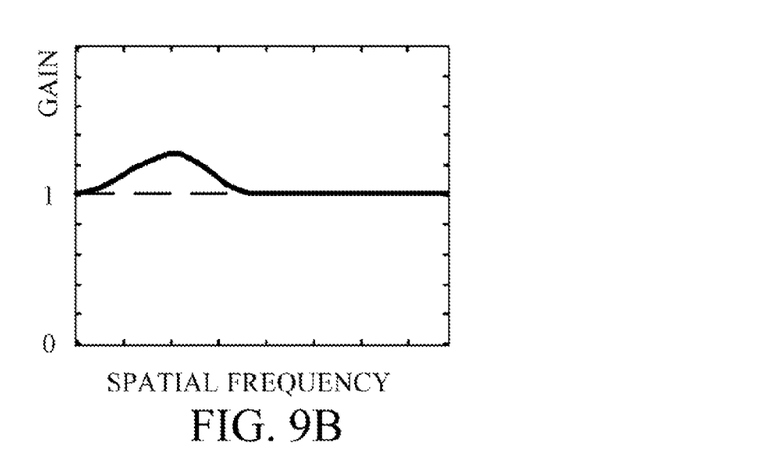
Figure 9C:
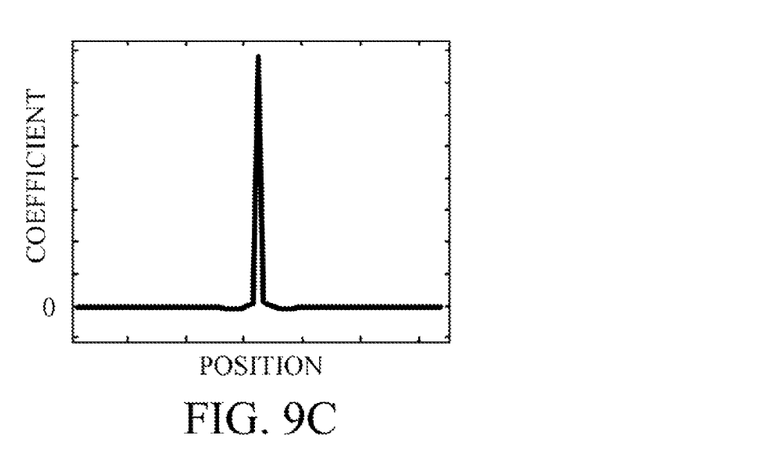

Moreover, FIG. 9B shows a frequency characteristic of an image restoration filter restricting the image restoration band according to the specific frequency (zero fall frequency). In FIG. 9B, a horizontal axis shows spatial frequency, and a vertical axis shows restoration gain. As understood from comparison of FIG. 9B with FIG. 12B, the image restoration filter shown in FIG. 9B has no low-pass filter effect on the higher frequency side band, so that a profile of the image restoration filter shown in FIG. 9C (where a horizontal axis shows tap position in the filter, and a vertical axis shows tap value (coefficient value)) is sharp. Thus, performing the image restoration process using this image restoration filter can restore an image part whose frequency is within the lower frequency side band excellently while maintaining an image part having a low MTF but existing as a detail part in the captured image without change (that is, without generating blur due to the image restoration process).

Figure 10A:
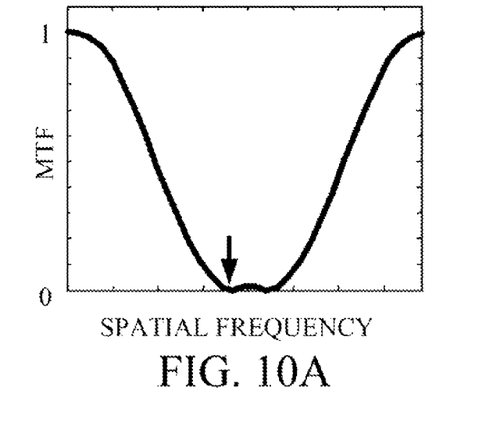
FIGS. 10A to 10C show another characteristic of the image restoration filter in Embodiment 1.
Figure 10B:
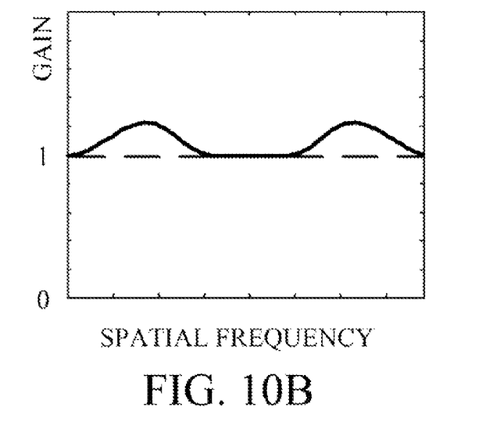
Figure 10C:
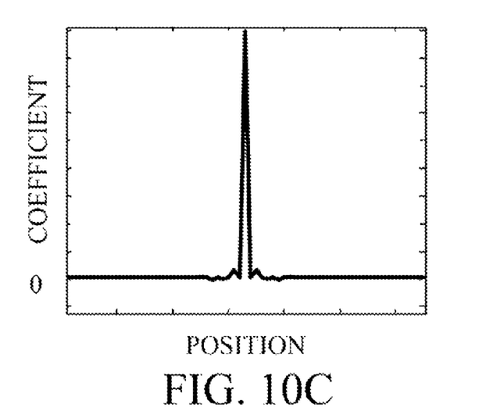

Moreover, FIG. 10A shows the same MTF as that shown in FIG. 13A. In FIG. 10A, a horizontal axis shows spatial frequency, and a vertical axis shows MTF. FIG. 10B shows a frequency characteristic of another image restoration filter restricting the image restoration band according to the specific frequency (zero fall frequency). In FIG. 10B, a horizontal axis shows spatial frequency, and a vertical axis shows restoration gain. FIG. 10C shows a profile of the image restoration filter. According to comparison with FIG. 13B, coefficient values of the image restoration filter shown in FIG. 10B do not change greatly at plural positions within a narrow positional range. Thus, the image restoration filter shown in FIG. 10B has a tolerance for difference in PSF while excellently restoring an image part whose frequency band including no zero fall.

Since the OTF of the image capturing optical system changes with image heights, that is, positions in the captured image, the zero fall frequency also depends on the image heights. Thus, the specific frequency may be obtained at each position in the captured image to change the characteristic of the produced image restoration filter. In this case, except changing the specific frequency, the process may be performed according to the flowchart described in this embodiment.

Figure 7:
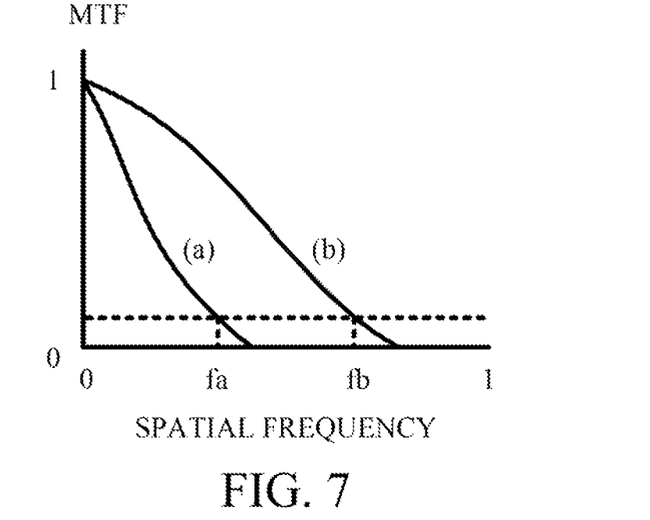
FIG. 7 shows MTFs and zero fall frequencies in azimuth directions orthogonal to each other in Embodiment 1.
Figure 8A:
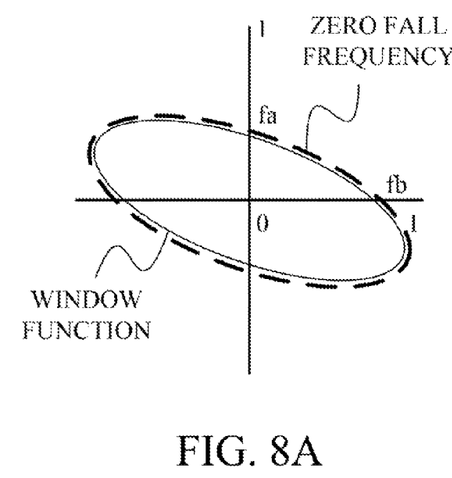
FIGS. 8A to 8D show window functions in Embodiment 1.

Next, a detailed description of the window function produced at step S15 will be made. FIG. 7 shows MTFs in two azimuth directions orthogonal to each other. FIGS. 8A and 8C show distributions of the MTFs shown in FIG. 7 seen from above (that is, from a vertical direction to a two-dimensional image surface). A dotted line in each of FIGS. 8A and 8C shows a specific frequency that is decided according to a threshold value t1 shown in FIG. 7 and changes according to the azimuth direction. A solid line in each of FIGS. 8A and 8C shows frequency at which a value of the window function becomes 0, the window function having a value larger than 0 inside the solid line. The "0" as the value of the window function includes a value sufficiently smaller than 1 and therefore can be regarded as 0.

Figure 8B:
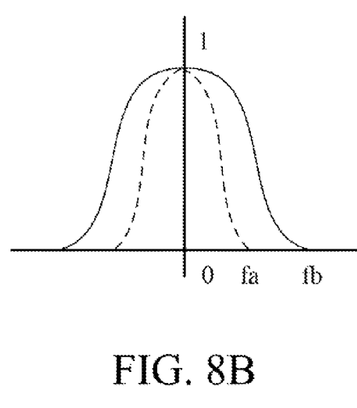
Figure 8C:
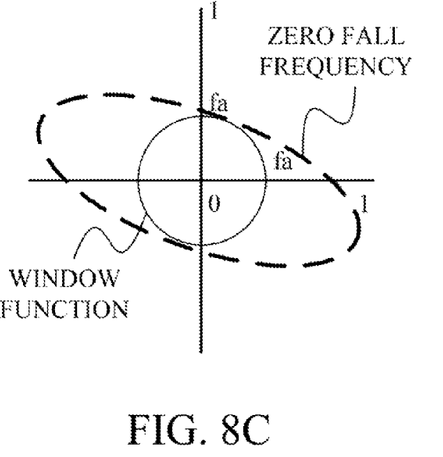

FIG. 8B shows a profile of the window function shown in FIG. 8A. A dotted line in FIG. 8B shows a profile of the window function in a vertical direction in FIG. 8A, and a solid line in FIG. 8B shows a profile in a horizontal direction in FIG. 8A. It is desirable to produce the window function according to a zero fall characteristic (shown in FIG. 8B) of the MTF depending on the azimuth direction. The window function shown in FIG. 8B is a non-rotationally symmetric function corresponding to the specific frequency (zero fall frequency) changing according to the azimuth direction.

Figure 8D:
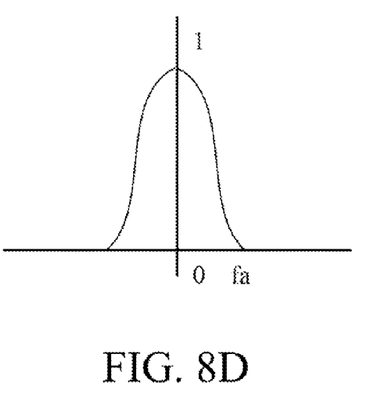

As another example, FIGS. 8C and 8D shows a rotationally symmetric window function produced by using a representative specific frequency as a minimum value of the zero fall frequencies (specific frequencies) in respective azimuth directions. In a case of using such a window function, though the MTF does not include the zero fall, the image restoration band becomes narrow in azimuth directions subjected to band restriction by the window function.

Such production of the window function by using the specific frequency obtained from the actual MTF (that is, the absolute value of the OTF) changing according to the azimuth direction enables production of a window function, and furthermore an image restoration filter matching the optical transfer function (OTF) of the image capturing optical system with good accuracy.

The window function may be produced by asymmetrically transforming a generally-known window function such as a Gaussian window or a Hanning window according to a specific frequency characteristic in each azimuth direction, which is obtained from the optical transfer function, or may be newly produced.

Moreover, the window function W(u,v) matching the specific frequency changing according to the azimuth direction can be produced on the basis of the MTF at each image height. An example of such a window function is shown by the following expression (3):

$$W(u,v)=|H(u,v)|^N$$

where N represents a real number parameter.

Since the image restoration process uses the OTF at each image height to produce the image restoration filter, such a method for producing the window function by using the MTF at each image height does not increase amount of data. In addition, even when it is difficult to express the azimuth characteristic of the specific frequency by a function with high accuracy, the method enables production of the window function. This is because the frequency subjected to the restriction by the window function can be corresponded to the MTF.

This embodiment enables, even though the input image includes the zero fall of the MTF, acquisition of a high-definition restored image while suppressing generation of undesirable effects such as image blur and ringing on the higher frequency side band than the specific frequency.

Embodiment 2

Figure 11:
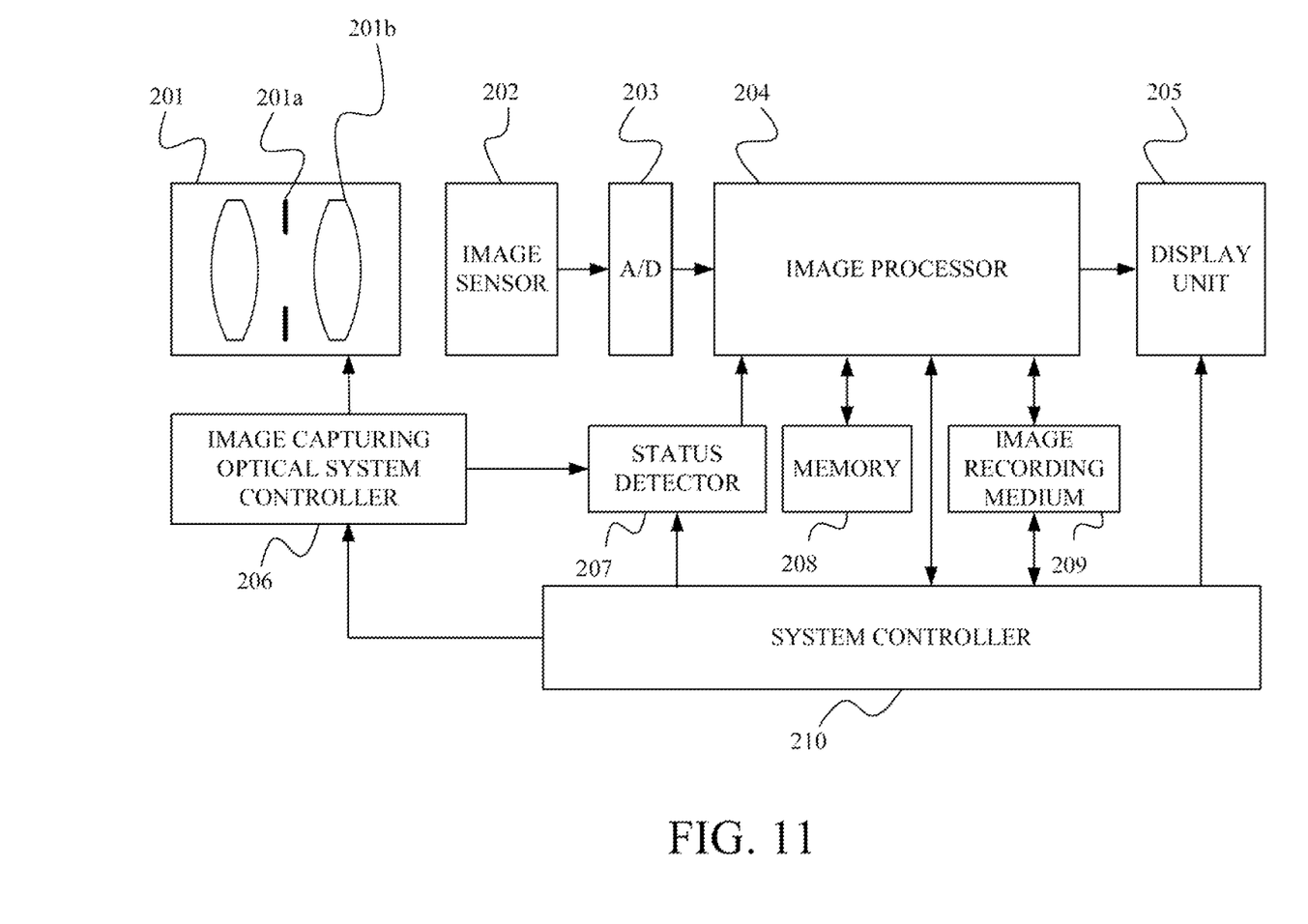
FIG. 11 is a block diagram showing a configuration of an image pickup apparatus that is Embodiment 2 of the present invention.

Next, description will be made of an image pickup apparatus that is a second embodiment (Embodiment 2) of the present invention with reference to FIG. 11. The image pickup apparatus is provided with an image processing apparatus that performs the image restoration process by the image processing method described in Embodiment 1.

An image capturing optical system 201 causes light from an object (not shown) to form an object image. An image sensor 202 photoelectrically converts the object image to output an analog electric signal. The analog signal output from the image sensor 202 is converted to a digital signal by an A/D converter 203 to be input to an image processor 204.

The image processor 204 performs various image processes on the input digital signal to produce a captured image (input image), and then performs the image restoration process described in Embodiment 1 on the captured image. A system from the image sensor 202 to a part producing the captured image in the image processor 204 constitutes an image capturing system. A part performing the image restoration process in the image processor 204 corresponds to an image processing apparatus including an inputting part, a calculating part, a window function producing part, a filter producing part and a processing part.

A status detector 207 acquires the image capturing condition information (described in Embodiment 1) at the time of producing the captured image to be used for the image restoration process performed by the image processor 204. The status detector 207 may acquire the image capturing condition information from a system controller 210. Moreover, the status detector 207 may acquire the image capturing condition relating to the image capturing optical system 201 from an image capturing optical system controller 206 that controls operation of an aperture stop 201a and movement of a lens 201b such as a zoom lens or a focus lens. The image processor 204 as a computer performs the image restoration process described by using the flowchart shown in FIG. 1. Optical transfer functions (OTFs) and coefficient data to be used for producing the optical transfer functions (OTFs) are prestored in a memory 208.

The image processor 204 stores a restored image (output image) produced by the image restoration process to an image recording medium 209 such as a semiconductor memory or an optical disk, and causes a display unit 205 to display the restored image. The system controller 210 controls a series of the above-described operations.

The image capturing optical system 201 may include optical elements such as a low-pass filter and an infrared cutting filter. When the image capturing optical system 201 includes an optical element such as a low-pass filter influencing the optical transfer function (OTF) of the image capturing optical system 201, that optical element should be taken into account when producing the image restoration filter. When using the infrared cutting filter, since it provides an influence to a PSF (which is an integration value of a point spread function (PSF) of a spectral wavelength) for each of R, G and B channels, particularly on the PSF for the R channel, the infrared cutting filter should be taken into account when producing the image restoration filter.

The image capturing optical system 201 may be interchangeable to the image pickup apparatus, as mentioned above.

Embodiment 3

Although Embodiment 2 has described the image pickup apparatus using the image processing method (that is, the image pickup apparatus provided with the image processing apparatus), a third embodiment (Embodiment 3) of the present invention will describe a case where the image processing method is implemented by an image processing program installed to a personal computer. In this case, the personal computer corresponds to an image processing apparatus. The personal computer acquires a captured image (non-restored image) produced by an image pickup apparatus through wired or wireless communication from the image pickup apparatus, or through a line of Internet from another personal computer.

The personal computer may acquire the captured image through an image recording medium in which the captured image is recorded. Then, the personal computer that has acquired the captured image performs the image restoration process according to the image processing program, and outputs a resulting restored image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-184794, filed on Aug. 26, 2011, which is hereby incorporated by reference herein in its entirety.

What is claimed is:

1. An image processing method for performing an image restoration process on an input image produced by an image pickup apparatus, the method comprising the steps of:
   acquiring the input image and information on an image capturing condition at a time of producing the input image in the image pickup apparatus;
   acquiring an optical transfer function of the image pickup apparatus corresponding to the information on the image capturing condition;
   calculating a specific frequency at which an index value obtained by using the optical transfer function becomes a predetermined value in each of azimuth directions;
   producing a window function to divide a frequency band of the input image into a lower frequency side band and a higher frequency side band than the specific frequency calculated in each of the azimuth directions;
   producing, by using the window function and the optical transfer function, an image restoration filter to perform the image restoration process on the lower frequency side band of the input image and to restrict the image restoration process on the higher frequency side band thereof; and
   performing the image restoration process using the image restoration filter.

2. An image processing method according to claim 1, wherein the specific frequency is a lowest one of frequencies at which the index value becomes the predetermined value.

3. An image processing method according to claim 1, wherein the window function is a non-rotationally symmetric function corresponding to the specific frequency changing according to the azimuth direction.

4. An image processing method according to claim 1, wherein the step of producing the window function produces the window function by using an absolute value of the optical transfer function.

5. An image processing method according to claim 1, wherein the step of calculating the specific frequency calculates the specific frequency at each position in the input image, and
   wherein the step of producing the image restoration filter changes a characteristic of the image restoration filter at each position in the input image.

6. An image processing apparatus configured to perform an image restoration process on an input image produced by an image pickup apparatus, the image processing apparatus comprising:
   an inputting part configured to acquire the input image and information on an image capturing condition at a time of producing the input image in the image pickup apparatus;
   a calculating part configured to acquire an optical transfer function of the image pickup apparatus corresponding to the information on the image capturing condition and configured to calculate a specific frequency at which an index value obtained by using the optical transfer function becomes a predetermined value in each of azimuth directions;
   a window function producing part configured to produce a window function to divide a frequency band of the input image into a lower frequency side band and a higher frequency side band than the specific frequency calculated in each of the azimuth directions;
   a filter producing part configured to produce, by using the window function and the optical transfer function, an image restoration filter to perform the image restoration process on the lower frequency side band of the input image and to restrict the image restoration process on the higher frequency side band thereof; and
   a processing part configured to perform the image restoration process using the image restoration filter.

7. An image pickup apparatus comprising:
   an image capturing system configured to include an image sensor performing photoelectric conversion of an object image formed by an image capturing optical system and configured to produce a captured image by using output from the image sensor; and
   an image processing apparatus configured to perform an image restoration process on an input image that is the captured image, the image processing apparatus comprising:
   an inputting part configured to acquire the input image and information on an image capturing condition at a time of producing the input image in the image pickup apparatus;
   a calculating part configured to acquire an optical transfer function of the image pickup apparatus corresponding to the information on the image capturing condition and configured to calculate a specific frequency at which an index value obtained by using the optical transfer function becomes a predetermined value in each of azimuth directions;
   a window function producing part configured to produce a window function to divide a frequency band of the input image into a lower frequency side band and a higher frequency side band than the specific frequency calculated in each of the azimuth directions;
   a filter producing part configured to produce, by using the window function and the optical transfer function, an image restoration filter to perform the image restoration process on the lower frequency side band of the input image and to restrict the image restoration process on the higher frequency side band thereof; and
   a processing part configured to perform the image restoration process using the image restoration filter.

8. A non-transitory storage medium storing an image processing program to cause a computer to execute an image restoration process on an input image produced by an image pickup apparatus, the program comprising the steps of:
   causing the computer to acquire the input image and information on an image capturing condition at a time of producing the input image in the image pickup apparatus;

causing the computer to acquire an optical transfer function of the image pickup apparatus corresponding to the information on the image capturing condition;

causing the computer to calculate a specific frequency at which an index value obtained by using the optical transfer function becomes a predetermined value in each of azimuth directions;

causing the computer to produce a window function to divide a frequency band of the input image into a lower frequency side band and a higher frequency side band than the specific frequency calculated in each of the azimuth directions;

causing the computer to produce, by using the window function and the optical transfer function, an image restoration filter to perform the image restoration process on the lower frequency side band of the input image and to restrict the image restoration process on the higher frequency side band thereof; and causing the computer to perform the image restoration process using the image restoration filter.

9. An image processing method for performing an image restoration process on an input image produced by an image pickup apparatus, the method comprising the steps of:

acquiring the input image and information on an image capturing condition at a time of producing the input image in the image pickup apparatus;

acquiring an optical transfer function of the image pickup apparatus corresponding to the information on the image capturing condition;

calculating a specific frequency at which an index value obtained by using the optical transfer function becomes a predetermined value;

producing a window function to divide a frequency band of the input image into a lower frequency side band and a higher frequency side band than the specific frequency;

producing, by using the window function and the optical transfer function, an image restoration filter to perform the image restoration process on the lower frequency side band of the input image and to restrict the image restoration process on the higher frequency side band thereof; and performing the image restoration process using the image restoration filter.

10. An image processing apparatus configured to perform an image restoration process on an input image produced by an image pickup apparatus, the image processing apparatus comprising:

an inputting part configured to acquire the input image and information on an image capturing condition at a time of producing the input image in the image pickup apparatus;

a calculating part configured to acquire an optical transfer function of the image pickup apparatus corresponding to the information on the image capturing condition and configured to calculate a specific frequency at which an index value obtained by using the optical transfer function becomes a predetermined value;

a window function producing part configured to produce a window function to divide a frequency band of the input image into a lower frequency side band and a higher frequency side band than the specific frequency;

a filter producing part configured to produce, by using the window function and the optical transfer function, an image restoration filter to perform the image restoration process on the lower frequency side band of the input image and to restrict the image restoration process on the higher frequency side band thereof; and a processing part configured to perform the image restoration process using the image restoration filter.

11. An image pickup apparatus comprising:

an image capturing system configured to include an image sensor performing photoelectric conversion of an object image formed by an image capturing optical system and configured to produce a captured image by using output from the image sensor; and an image processing apparatus configured to perform an image restoration process on an input image that is the captured image, the image processing apparatus comprising:

an inputting part configured to acquire the input image and information on an image capturing condition at a time of producing the input image in the image pickup apparatus;

a calculating part configured to acquire an optical transfer function of the image pickup apparatus corresponding to the information on the image capturing condition and configured to calculate a specific frequency at which an index value obtained by using the optical transfer function becomes a predetermined value;

a window function producing part configured to produce a window function to divide a frequency band of the input image into a lower frequency side band and a higher frequency side band than the specific frequency;

a filter producing part configured to produce, by using the window function and the optical transfer function, an image restoration filter to perform the image restoration process on the lower frequency side band of the input image and to restrict the image restoration process on the higher frequency side band thereof; and a processing part configured to perform the image restoration process using the image restoration filter.

12. A non-transitory storage medium storing an image processing program to cause a computer to execute an image restoration process on an input image produced by an image pickup apparatus, the program comprising the steps of:

causing the computer to acquire the input image and information on an image capturing condition at a time of producing the input image in the image pickup apparatus;

causing the computer to acquire an optical transfer function of the image pickup apparatus corresponding to the information on the image capturing condition;

causing the computer to calculate a specific frequency at which an index value obtained by using the optical transfer function becomes a predetermined value;

causing the computer to produce a window function to divide a frequency band of the input image into a lower frequency side band and a higher frequency side band than the specific frequency;

causing the computer to produce, by using the window function and the optical transfer function, an image restoration filter to perform the image restoration process on the lower frequency side band of the input image and to restrict the image restoration process on the higher frequency side band thereof; and causing the computer to perform the image restoration process using the image restoration filter.

* * * * *